US012662643B2

(12) United States Patent
Hervé et al.

(10) Patent No.: US 12,662,643 B2
(45) Date of Patent: Jun. 23, 2026

(54) USE OF A BIODEGRADABLE LUBRICANT BASE, AND METHOD FOR THE PREPARATION THEREOF

(71) Applicant: NYCO, Paris (FR)

(72) Inventors: Grégoire Hervé, Paris (FR); Antoine Vatin, Mours (FR); Yves Travert, Eragny sur Oise (FR); Delphine Crozet, Solaize (FR)

(73) Assignee: NYCO, Paris (FR)

( * ) Notice: Subject to any disclaimer, the term of this patent is extended or adjusted under 35 U.S.C. 154(b) by 150 days.

(21) Appl. No.: 18/703,894

(22) PCT Filed: Nov. 3, 2022

(86) PCT No.: PCT/EP2022/080723

§ 371 (c)(1),
(2) Date: Apr. 23, 2024

(87) PCT Pub. No.: WO2023/079025

PCT Pub. Date: May 11, 2023

(65) Prior Publication Data

US 2025/0313770 A1 Oct. 9, 2025

(30) Foreign Application Priority Data

Nov. 4, 2021 (FR) ...................................... 2111745

(51) Int. Cl.

*C10M 105/42* (2006.01)
*C10M 177/00* (2006.01)
*C11C 1/02* (2006.01)
*C10N 30/00* (2006.01)

(52) U.S. Cl.

CPC ........ *C10M 105/42* (2013.01); *C10M 177/00* (2013.01); *C11C 1/02* (2013.01); *C10M 2207/301* (2013.01); *C10N 2030/64* (2020.05)

(58) Field of Classification Search

None
See application file for complete search history.

(56) References Cited

U.S. PATENT DOCUMENTS 2,049,072 A 7/1936 Mikeska

OTHER PUBLICATIONS

International Search Report for PCT/EP2022/080723, mailed Mar. 3, 2023, 4 pages.
Written Opinion of the ISA for PCT/EP2022/080723, mailed Mar. 3, 2023, 5 pages.

*Primary Examiner* — Vishal V Vasisth
(74) *Attorney, Agent, or Firm* — NIXON & VANDERHYE, PC

(57) ABSTRACT

The present invention relates to the use of a fluid lubricant base comprising at least one biosourced and biodegradable compound having formula (I) in order to lubricate devices and/or machines, such as wind turbines, wherein said at least one compound having formula (I) corresponds to formula (I) in which R1, R2 and R3 are, independently, linear or branched saturated hydrocarbon groups comprising at least 16 carbon atoms, at least one group among R1, R2 and R3 comprises, on the hydrocarbon chain thereof, at least one ester group O—CO—R4, where R4 is a linear or branched alkyl radical comprising from 1 to 10 carbon atoms, preferably from 1 to 6 carbon atoms. The lubricant base has an acid number, in mg KOH/g measured according to the standard ISO 6618, which ranges from 0 to 0.5. The present invention further relates to a method for manufacturing the lubricant base as defined above and to the lubricant base thus obtained.

20 Claims, No Drawings

USE OF A BIODEGRADABLE LUBRICANT BASE, AND METHOD FOR THE PREPARATION THEREOF

This application is the U.S. national phase of International Application No. PCT/EP2022/080723 filed Nov. 3, 2022, which designated the U.S. and claims priority to FR Patent Application No. 2111745 filed Nov. 4, 2021, the entire contents of each of which are hereby incorporated by reference.

TECHNICAL FIELD OF THE INVENTION

The present invention relates to the technical field of biodegradable and preferably biosourced lubricants.

In particular, the present invention relates to a new use of a biodegradable lubricating base comprised of vegetable oil esters for lubricating applications, especially in order to lubricate gears (for example of wind turbines), ground turbines, stern tubes and other equipment used in the maritime field or even chainsaw chains used in forestry companies. The present invention also concerns the process for preparing this lubricating base. Finally, the present invention is also directed to a lubricating base obtained according to the abovementioned process.

STATE OF THE ART

Lubrication is a process used to reduce friction between two moving elements. The introduction of a lubricant between two pieces therefore makes it possible to reduce friction and hence the negative effects resulting therefrom, such as wear, fatigue, corrosion of the pieces, breakage, etc.

Thus, a lubricant composition must meet particular technical performance requirements, especially in terms of viscosity, viscosity index, rheology (both cold and hot) and flash point. The viscosity is chosen according to the application and the system to be lubricated. By way of example, industrial gears require more viscous grades around ISO VG 220 and ISO VG 320, while stern oils require grade ISO VG 100 and ISO VG 150.

At the same time, considering environment and its protection have currently become a major issue. Indeed, some of the lubricants used in wind farms, in forestry harvesting or in marine environments (boats, wind turbines and offshore structures, etc.) are likely to be dispersed in the environment and can be a source of pollution for the seas/oceans, soil, run-off water and groundwater. By way of example, in the case of oils used for the permanent lubrication of chainsaws, drops of oil continually fall to the ground: this is lost lubrication and amounts of oil discharged into the environment are not negligible. The same pollution problems arise with hydraulic fluids used on machines: in this case it is no longer a question of lost lubrication but of dispersion of lubricants into the surrounding environment as a result of leaks due to lack of tightness or accidental breakage of hoses and seals, which are inherent in the operation of these machines.

Solutions have been provided in prior art.

By way of example, lubricating compositions based on alkyl or neopolyol isostearate have been developed and may especially correspond to the commercial products Nycobase SNG, NB 8318S, Nycobase STM and Nycobase SMP. These esters are especially formed from isostearic acid (iso-C18) from the industrial manufacture of the dimeric acid. These esters especially have viscous grades ranging from ISO VG 46 to ISO VG 150, standard NF ISO 3448, which are suitable for the needs of lubrication processes. However, their synthesis remains relatively restricted and limited for the following reasons:

- the limited production of this isostearic acid, which is a minority co-product of the manufacture of the dimeric fatty acid and is therefore on the one hand dependent on the latter and on the other hand industrially difficult to access with a view to more widespread use;
- the complex nature of the industrial mixture of isostearic acid, the purity of which fluctuates between 60 and 80%;
- the variable quality from one manufacturer to another, leading to different compositions (varying levels of unsaponifiable matter, ring structures, etc.), making it difficult to secure quality supplies; and
- variable quality from one batch to another can lead to variable application properties and thus, for example, to variable and problematic interfacial properties.

Document U.S. Pat. No. 2,049,072, published in 1936, describes a process for manufacturing materials for forming lubricants. In particular, the purpose of this document is to provide a lubricant composition to be mixed with a mineral oil and the object of which is therefore not to provide a biodegradable lubricating base.

The process described in that document comprises:

- at least partially esterifying an aliphatic organic material containing hydroxyl groups, such as castor oil with an organic acid such as acetyl chloride in the presence or absence of a catalyst;
- optionally, a stabilisation step, for example by hydrogenation, so as to obtain, for example, esterified and hydrogenated castor oil.

However, as will be demonstrated below in the experimental part, the present Applicant has carried out comparative tests and has demonstrated that the process described in that document and especially those exemplified, do not make it possible to obtain a high-performance lubricating base having a good acid number, good resistance to oxidation and ageing and good resistance to hydrolysis according to current standards, respectively standard ISO 6618, standard TOST and ASTM E222B.

The Applicant further points out that the authors of that document indicate that partial esterification leads to sufficient performance to improve quality of the mineral oil after mixing. However, the Applicant has reproduced a partial esterification in the laboratory (equimolar ratio of castor oil and acetyl chloride) and it appears that the partially acetylated product is not liquid but solid. Partial esterification does not, therefore, make it possible to obtain a lubricating base for lubricating devices, such as wind turbines, that are operable (i.e. in liquid form).

Finally, the Applicant points out that that document dates back to 1936 and that, to their knowledge, no professional in the lubricant sector has provided such a castor oil-based lubricating base on the market in the past or at present. This teaching has therefore not been adhered to by professionals in the sector. This seems to be due to the fact that the lubricating bases described, even if they give satisfactory results in terms of viscosity, are unsatisfactory in terms of other essential characteristics for a lubricant, such as acid number, ageing or even resistance to hydrolysis.

There is thus a need to have new lubricant compositions that are biodegradable and thus more environmentally friendly than traditional petroleum-derived lubricants, while retaining at least similar technical performance, namely fluid compositions with fairly high viscosity grades ranging from ISO VG 46 to ISO VG 150, or even higher.

There is also a need in the state of the art to have new biodegradable and preferably biosourced lubricating compositions, having adequate technical performance, with improved interfacial properties, while being easy to implement, namely while being easily achievable in terms of its preparation process, the process being able to or configured to provide liquid compositions stable to water, to air, having identical or at least similar technical characteristics from one batch to another.

There is also a need in the state of the art to have new lubricating compositions which have good resistance to hydrolysis (i.e., resistance to water), an adequate acid number and which would thus be particularly adapted to marine applications.

The purpose of the present invention is thus to provide a new lubricating base which meets at least part of the aforementioned needs.

DISCLOSURE OF THE INVENTION

To this end, the present invention relates to the use of a lubricating base comprising at least one biosourced and biodegradable compound of the formula (I) in order to lubricate devices and/or machines, such as wind turbines and stern tubes, wherein said at least one compound of the formula (I) has the following formula:

(I)

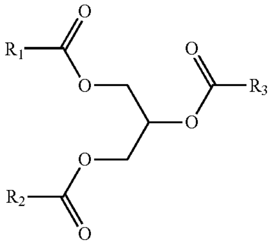

wherein $R_1$, $R_2$ and $R_3$ are independently linear or branched saturated hydrocarbon groups comprising at least 16 carbon atoms, at least one group of $R_1$, $R_2$ and $R_3$ is branched on its hydrocarbon chain with at least one ester group O—CO—$R_4$ wherein $R^4$ is a linear or branched alkyl radical comprising from 1 to 10 carbon atoms, preferably from 1 to 6 carbon atoms, and wherein said lubricating base has an acid number, in mg KOH/g, measured according to standard ISO 6618, which ranges from 0 to 0.5.

Further non-limiting and advantageous characteristics of the use in accordance with the invention, taken individually or according to any technically possible combinations, are as follows:

the hydrocarbon groups $R_1$, $R_2$ and $R_3$ comprise from 18 to 24 carbon atoms, preferably from 18 to 20 carbon atoms;

the group $R_4$ of the ester group —O—CO—$R_4$ is selected from a methyl, ethyl, propyl or iso-propyl radical;

on said at least one hydrocarbon chain from $R_1$, $R_2$ and $R_3$ branched with the ester group —O—CO—$R_4$, the latter is positioned in position 9, 10 or 12 or in position 14;

at least two hydrocarbon groups from among $R_1$, $R_2$ and $R_3$ and preferably all the hydrocarbon groups $R_1$, $R_2$ and $R_5$ are branched with the ester group —O—CO—$R_4$;

the lubricating base also comprises at least one other biodegradable or partially biodegradable lubricating compound different from the compound of the formula (I), such as an alkyl or neopolyol isostearate, a polyalphaolefin (PAO), a mineral oil or a mixture thereof;

the lubricating base has a foaming tendency, measured according to standard ASTM D 892, ranging from 0 to 200 mL, preferably ranging from 0 to 100 mL and typically ranging from 0 to 50 mL;

the lubricating base has a demulsification time, measured according to ASTM D 1401, ranging from 0 to 30 minutes, preferably ranging from 0 to 15 minutes and typically ranging from 0 to 10 minutes;

the lubricating base has an oil air release time, measured according to standard NF ISO 9120, December 1999, ranging from 1 to 10 minutes, preferably ranging from 1 to 5 minutes and typically ranging from 1 to 3 minutes, the lubricating base has a resistance to hydrolysis, measured according to standard DEF STAN 05-50 (Part 61), Method 6 ("Ministry of Defence, Defence Standard 05-50 (Part 61), Method 6"), which ranges from 300 to 2000 hours, preferably from 600 to 1500 hours and typically from 750 to 900 hours;

the lubricating base comprises, by mass, relative to its total mass, at least 50%, preferably at least 80%, in particular at least 90% and typically 100% of said at least one compound of the formula (I).

The present invention also relates to a process for preparing a lubricating base as defined above, comprising a step (i) of preparing said at least one compound of the formula (I) as defined above, said step (i) comprising the following successive steps and preferably comprising only the following three steps:

(a) providing at least one previously hydrogenated vegetable oil or hydrogenating a vegetable oil, said vegetable oil being comprised of at least one triglyceride comprising at least 50% (relative % determined by GPC) of fatty acids having at least one saturated or unsaturated, linear or branched hydrocarbon chain comprising at least 16 carbon atoms, preferably at least 18 carbon atoms, one of said fatty acids being branched with at least one hydroxyl group —OH;

(b) selectively esterifying, at said at least one hydroxyl group —OH, said hydrogenated vegetable oil obtained at the end of step (a) with at least one organic acid anhydride;

(c) recovering at least one vegetable oil ester corresponding to the formula (I), so as to obtain a lubricating base comprising an acid number, in mg KOH/g, measured according to standard ISO 6618, ranging from 0 to 0.5.

Further non-limiting and advantageous characteristics of the process in accordance with the invention, taken individually or according to any technically possible combinations, are as follows:

the vegetable oil of step (a) comprises at least one triglyceride of the following formula:

(I)

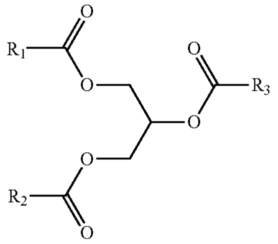

wherein the hydrocarbon groups $R_1$, $R_2$ or $R_3$ are independently saturated, linear or branched hydrocarbon groups comprising at least 16 carbon atoms, at least one group among $R_1$, $R_2$ and $R_3$ is branched on its hydrocarbon chain with at least one hydroxyl group —OH;

at least two and typically all three of the groups $R_1$, $R_2$ or $R_3$ are branched on their hydrocarbon chains with at least one hydroxyl group —OH;

between said selective esterification step (b) and before conducting step (c) of recovering said at least one vegetable oil ester, the process may comprise the following intermediate steps:

(b1) a topping step;

(b2) a cooling step, (b3) a neutralisation step;

(b4) optionally, a fine filtration step;

the lubricating base comprises, by mass, relative to its total mass, at least 50%, preferably at least 80%, in particular at least 90% and typically 100% of said at least one compound of the formula (I);

the process may include a step (ii) which comprises mixing said at least one vegetable oil ester of the formula (I) obtained at the end of step (i) with at least one other biodegradable lubricating compound;

the vegetable oil is selected from one or more of the following oils: castor oil, lesquerella oil or any other oil comprising at least 50% fatty acids (relative % determined by GPC) selected from: ricinoleic acid (C18:1-OH), densipolic acid (C18:2-OH), lesquerolic acid (C20:1-OH), or even auricolic acid (C20:2-OH);

the organic acid anhydride has the formula (II) below:

(II)

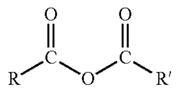

where R and R' are independently selected from a linear or branched alkyl chain comprising from 1 to 12, in particular from 1 to 6 and typically from 1 to 4 carbon atoms;

the organic acid anhydride is in particular selected from the group consisting of acetic anhydride, propionic anhydride, butyric anhydride or isobutyric anhydride and a mixture thereof.

The present invention is also directed to a lubricating base comprising at least one biosourced and biodegradable compound of the formula (I) as defined above obtained according to the abovementioned process (step (i)), characterised in that it has an acid number, in mg KOH/g, measured according to standard ISO 6618, ranging from 0 to 0.5.

Preferably, the lubricating base has a resistance to hydrolysis, measured according to standard DEF STAN 05-50 (part 61), method 6, which ranges from 300 to 2000 hours.

Of course, the different characteristics, alternatives and embodiments of the invention may be combined with one another according to various combinations insofar as they are not incompatible or exclusive of one another.

In addition, various other characteristics of the invention are apparent from the appended description, which illustrate non-limiting embodiments of the invention.

DETAILED DESCRIPTION OF THE INVENTION

The applicant has endeavoured to develop new lubricating compositions based on esters with long fluid branched saturated fatty chains for being used both hot and cold for lubrication purposes, such as for lubricating machines and/or devices such as wind turbines (onshore or offshore).

The applicant has also endeavoured to develop new biosourced and biodegradable fluid lubricant compositions which further comply with the European Ecolabel for lubricants (NF511).

To this end, the present invention refers to the use of a fluid lubricating base comprising at least one biosourced and biodegradable ester compound of the formula (I) in order to lubricate devices and/or machines, such as wind turbines and stern tubes, wherein said at least one compound of the formula (I) has the following formula:

(I)

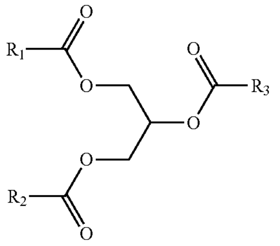

wherein $R_1$, $R_2$ and $R_3$ are independently linear or branched saturated hydrocarbon groups comprising at least 16 carbon atoms, at least one of $R_1$, $R_2$ and $R_3$ is branched on its hydrocarbon chain with at least one ester group O—CO—$R_4$ wherein $R^4$ is a linear or branched alkyl radical comprising from 1 to 10 carbon atoms, preferably from 1 to 6 carbon atoms, and wherein said lubricating base has an acid number, in mg KOH/g, measured according to standard ISO 6618, which ranges from 0 to 0.5.

Due to its characteristics, the lubricating base according to the invention both has adequate lubrication properties and is environmentally friendly.

In particular, on the one hand, it has a high level of biodegradability, a high renewable carbon content and a non-salt origin, thus limiting its environmental and social impact. Indeed, esters with long saturated fatty chains according to the invention are biosourced and are derived, for example, from one or more vegetable oils, such as castor oil or lesquerella oil. These esters are furthermore biodegradable and comply with the European Ecolabel for lubricants (NF511). They are thus furthermore of little or no aquatic toxicity. This low ecotoxicity is illustrated by virtue of the test on daphnia (EL50-48 h (g/1000 g)>0.11/1000 according to OECD 202) and biodegradability (80.3% according to OECD 301B).

On the other hand, as will be demonstrated in the experimental section below, the lubricating base according to the invention has a high resistance to hydrolysis and improved interfacial properties, especially compared with the viscous esters obtained from isostearic acid mentioned earlier in the description of prior art.

In addition, it has an excellent acid number which makes it compatible with the components of devices and/or machines to be lubricated, such as elastomer-based seals, i.e. it has little or no impact on the life time of the materials in contact therewith (especially from a mechanical point of view).

Furthermore, it has a viscosity grade generally between 135 and 165 cSt, which is a grade comparable to the most viscous (simple) isostearate available on the market (ISO VG 150 grade).

Hereinafter "fluid" means that the lubricating base is able to flow at ambient temperature and is in liquid form under normal conditions of temperature (i.e. ambient temperature) and pressure (i.e. atmospheric pressure).

According to the invention, by "biosourced", it is meant a lubricating base manufactured entirely or at least partially from materials of biological origin (e.g. plant or animal) from renewable resources, such as vegetable oil.

Also, according to the invention, by "biodegradable lubricating base" it is meant its ability to be degraded by microorganisms present in the natural environment. The action of bacteria on the lubricant in the presence of water and oxygen transforms it, under ideal heat and time conditions, into carbon dioxide, mineral salts and water.

There are several ways of measuring biodegradability.

a) CEC L33 A 93 Test

Primary biodegradability measures the disappearance of the starting compound over a given period of time. The approved CEC L33 A 93 test carried out in a liquid medium is the most commonly used. Beyond a 90% degradation rate, the substance is highly biodegradable. A vegetable oil has a 90% degradation rate after 120 days of experiment. In contrast, a mineral-based lubricant is only 70% degraded over the same period of time.

b) OECD 301B Test

Ultimate biodegradability is based on the amount of carbon dioxide emitted over a given time (OECD 301B approved test). This measure is more restrictive and biodegradable products achieve lower rates than primary biodegradability. This criterion better reflects the real biodegradability of products, since it takes account of the total assimilation of the product by living organisms. Ultimate biodegradability, determined in a reactor using a soil medium, shows a degradation rate of more than 70% for biolubricants versus only 30% for a lubricant of mineral origin.

The lubricating base according to the invention has a degradation rate greater than or equal to 90% in the CEC L 33 A93 test and a degradation rate equal to or greater than 70%, preferably equal to or greater than 75% and generally equal to or greater than 80% determined according to the OECD 301B test.

The structure of the compounds of the formula (I) (esters) according to the invention will be described below.

As mentioned above, the hydrocarbon groups $R_1$, $R_2$ and $R_3$ of the compounds of the formula (I) are independently saturated, linear or branched hydrocarbon groups comprising at least 16 carbon atoms, at least one of these groups is branched with the ester group O—CO—$R_4$ (i.e. the ester function is not at the terminals of the hydrocarbon groups $R_1$, $R_2$ or even $R_3$).

By "at least 16 carbon atoms", it is meant a hydrocarbon chain comprising the following number of carbons or any interval between these values: 16; 17; 18; 19; 20; 21; 22; 23; 24; 25; 26; 27; 28; 29; 30; and so on.

Generally, the hydrocarbon groups $R_1$, $R_2$ and $R_3$ comprise from 18 to 24 carbon atoms, preferably from 18 to 22 carbon atoms and typically from 18 to 20 carbon atoms.

By "alkyl group", it is meant a linear or branched saturated hydrocarbon group comprising from 1 to 10 carbon atoms (C1 to C10), preferably from 1 to 6 carbon atoms (C1 to C6). According to the invention, "1 to 10 carbon atoms" comprises the following values and any interval between these values: 1; 2; 3; 4; 5; 6; 7; 8; 9; 10.

In general, the group $R_4$ of the ester group —O—CO—$R_4$ is selected from a methyl, ethyl, propyl or iso-propyl radical.

In particular, at least two hydrocarbon groups from among $R_1$, $R_2$ and $R_3$ and typically all the hydrocarbon groups from among $R_1$, $R_2$ and $R_3$ are branched with the ester group —O—CO—$R_4$.

As will be described below, the compounds of the formula (I) can be formed by esterification from a hydrogenated vegetable oil which comprises at least one fatty acid branched with a hydroxyl group (not hydroxyl-terminated), such as castor oil (C18:1-OH) or lesquerella oil (C20:2-OH).

The esterification reaction takes place at the hydroxyl group (—OH) of these oils. Thus, the hydrocarbon groups $R_1$, $R_2$ and $R_3$ can correspond to the hydrocarbon chains of the fatty acids contained in these oils. When the esterification reaction is carried out using castor oil, all the hydrocarbon groups $R_1$, $R_2$ and $R_3$ are branched with an ester group —O—CO—$R_4$ and when the esterification reaction is carried out using lesquerella oil, two of the hydrocarbon groups $R_1$, $R_2$ and $R_3$ comprise an ester group —O—CO—$R_4$.

Advantageously, on said at least one hydrocarbon chain $R_1$, $R_2$ and $R_3$ of the compound or compounds of the formula (I) branched with the ester group —O—CO—$R_4$, the latter is positioned in position 9, 10, 12 or in position 14 and is typically in position 12 or in position 14.

In general, the lubricating base comprises, by mass, relative to its total mass, at least 50%, preferably at least 80%, in particular at least 90% and typically 100% of said at least one compound of the formula (I).

According to the invention, "the lubricating base comprises, by mass, relative to its total mass, at least 50% of said at least one compound of the formula (I)" comprises the following values and any interval between these values: 50; 55; 60; 65; 70; 75; 80; 85; 86; 87; 88; 89; 90; 91; 92; 93; 94; 95; 96; 97; 98; 99; 100.

Thus, the lubricating base can also comprise at least one other biodegradable lubricating compound, different from the compound of the formula (I), such as an alkyl, for example $C_1$-$C_{10}$, or neopolyol isostearate, a polyalphaolefin (PAO), a mineral oil or a mixture thereof.

Typically, the lubricating base is comprised of/consists of only said at least one compound of the formula (I).

The lubricating base or said at least one compound of the formula (I) according to the invention advantageously has the following characteristics:

- a Gardner colour, measured according to standard ASTM 1544, which ranges from 1 to 8, preferably from 1 to 5 and typically from 1 to 2;

a density, measured according to standard ASTM D4052, which ranges from 0.930 to 0.970, preferably from 0.940 to 0.960 and typically ranges from 0.950 to 0.960;

a viscosity at 100° C., measured according to standard ISO 3104 with a laboratory viscometer of the cannon fenske type, which ranges from 16 to 22 $mm^2/s$, preferably from 18 to 20 $mm^2/s$ and is typically from 18.5 to 19.5 $mm^2/s$;

a viscosity at 40° C., measured according to the ISO 3104 standard with a laboratory viscometer of the cannon fenske type, which ranges from 100 $mm^2/s$ to 200 $mm^2/s$, preferably from 130 $mm^2/s$ to 170 $mm^2/s$ and typically from 160 $mm^2/s$ to 165 $mm^2/s$;

a viscosity index, measured according to standard ISO 2909, which ranges from 110 to 170, preferably from 125 to 155 and typically ranges from 130 to 135;

an acid number, in mg KOH/g, measured according to standard ISO 6618, which ranges from 0 to 0.5, preferably from 0 to 0.20 and typically from 0 to 0.05;

a hydroxyl number, measured according to standard ASTM E 222B, which ranges from 0 to 10, preferably from 0 to 5 and typically from 0 to 3;

an iodine value, in g/100 of oil, measured according to standard ISO 3961, which ranges from 0 to 10, preferably from 0 to 5 and typically from 0 to 3;

a COC flash point, measured according to standard ASTM D92, which ranges from 250 to 320, preferably from 265 to 310 and typically ranges from 295 to 305;

a resistance to hydrolysis, measured according to standard DEF STAN 05-50 (part 61) method 6, which ranges from 300 to 2000 hours, preferably from 600 to 1500 hours and is typically from 750 to 900 hours;

the lubricating base and/or said at least one compound of the formula (I) according to the invention also has increased interfacial properties in contact with air and water;

a foaming tendency, which corresponds to the volume of foam measured in a graduated cylinder after five minutes of air blowing through said lubricating base, measured according to standard ASTM D 892 carried out at three temperature sequences: sequence 1 at 24° C., sequence 2 at 93.5° C., and then cooling to sequence 3 at 24° C., ranging from 0 to 200 mL, preferably ranging from 0 to 100 mL and typically ranging from 0 to 50 mL, and ideally not foaming;

a demulsification time, measured according to standard ASTM D 1401, ranging from 0 to 30 minutes, preferably from 0 to 15 minutes and typically from 0 to 10 minutes (according to the ASTM D 1401 method, a known volume of oil (40 mL) is mixed with water (40 mL); the time required for the two fluids to separate is measured in minutes; the faster the separation, the better the de-emulsification);

an oil air release time, measured according to standard NF ISO 9120, December 1999, ranging from 1 to 10 minutes, preferably ranging from 1 to 5 minutes and typically ranging from 1 to 3 minutes (in particular, air release is the time, in minutes, during which air dispersed in the lubricating base is reduced to 0.2% of the total volume, at a prescribed temperature; in other words, air release is the time required during which the lubricating base manages, by itself, to reduce the air it contains);

an oil acid number variation (mg KOH/g) ranging from 0.0 to 5.0, preferably ranging from 0.0 to 2.0 and typically ranging from 0.0 to 1.0 according to the ASTM D664 method as described in example C below;

a volatile acidity (mg KOH/g) ranging from 0.0 to 5.0, preferably ranging from 0.0 to 2.0 and typically ranging from 0.0 to 1.0 according to the ASTM D974 method as described in comparative test C below;

a viscosity variation (%) ranging from −20 to +30, preferably ranging from −10 to +10 and typically ranging from 0.0 to 5.0 according to the ASTM D445 method as described in comparative test C below;

a deposit (mg/100 mL) ranging from 0 to 100, preferably ranging from 0 to 50 and typically ranging from 0 to 20 by gravimetry as described in comparative test C below;

a mass variation of the metals in gr (steel copper spiral) ranging from 0.00 to 1.00, preferably ranging from 0.00 to 0.50 and typically ranging from 0.00 to 0.10 as described in comparative test C below (obtained by weighing).

As will be demonstrated in the tests below, the resistance to hydrolysis is increased for the oil esters according to the invention, especially compared with a reference product (the isostearate mentioned above which corresponds to the NYCOBASE SMP product marketed by the company NYCO). The stability to hydrolysis according to standard DEF STAN 05-50 (part 61) method 6 increases from 400 hours for the NYCOBASE SMP product to between 790 hours and 850 hours for the compounds of the formula (I) according to the invention.

The lubricating base and/or said at least one compound of the formula (I) in fact has enhanced hydrolysis resistance properties in marine, aqueous or even damp environments. In particular, the lubricating base/said at least one compound of the formula (I) according to the invention has a stability to hydrolysis, measured according to standard DEF STAN 05-50 (part 61) method 6, greater than or equal to 300 hours and typically greater than or equal to 600 hours. By way of example, the lubricating base/said at least one compound of the formula (I) according to the invention has a stability to hydrolysis, measured according to standard DEF STAN 05-50 (part 61) method 6, preferably ranging from 650 hours to 2000 hours, in particular from 750 hours to 900 hours and typically from 780 hours to 900 hours. The resistance to hydrolysis of the lubricating base according to the invention is thus 25% to 100% greater than that of an isostearate of identical viscosity grade as defined above.

According to the invention, "a range greater than or equal to 300 hours" includes the following values or any interval between these values: 300; 350; 400; 450; 500; 550; 560; 570; 580; 590; 600; 610; 620; 630; 640; 650; 660; 670; 680; 690; 700; 710; 720; 730; 740; 750; 760; 770; 780; 790; 800; 810; 820; 830; 840; 850; 860; 870; 880; 890; 900; 910; 920; 930; 940; 950; 1000; 1100; 1200; 1300; 1400; 1500; 1600; 1700; 1800; 1900; 2000; 2100; 2200; 2300; 2400; 2500; 2600; 2700; 2800; 2900; 3000; 3100; 3200; 3300; 3400; 3500; and so on.

The present invention is also directed to a process for preparing a lubricating base as defined above.

In particular, the process according to the invention makes it possible especially to obtain compounds of the formula (I) making up the lubricating base according to the invention, namely esters with long branched fatty chains from at least one vegetable oil and this in a single step and can be summarised as follows:

Vegetable oil+organic anhydride→vegetable oil ester+organic acid.

By way of example, the reaction scheme may be as follows:

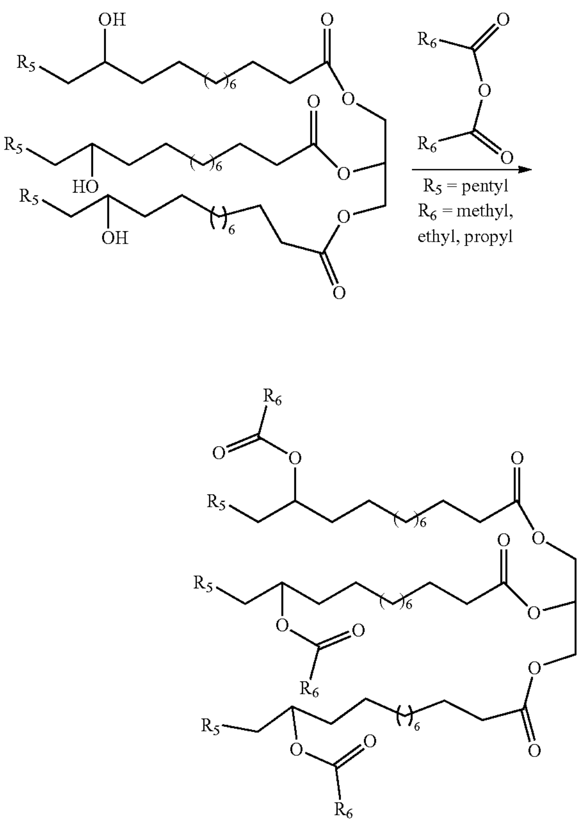

To this end, the process for preparing the lubricating base according to the invention comprises at least one step (i) of preparing said at least one compound of the formula (I) as aforesaid, said step (i) comprising the following successive steps and in general comprises only the following three steps:

(a) providing at least one previously hydrogenated vegetable oil or hydrogenating a vegetable oil, said vegetable oil (hydrogenated or not) being comprised of at least one triglyceride comprising at least 50% (relative % determined by GPC) of fatty acids having at least one saturated or unsaturated, linear or branched hydrocarbon chain comprising at least 16 carbon atoms, preferably at least 18 carbon atoms, one of said fatty acids being branched with at least one hydroxyl group —OH;

(b) selectively esterifying, at said at least one hydroxyl group —OH, said at least one fatty acid of said hydrogenated vegetable oil obtained at the end of step (a) with at least one organic acid anhydride;

(c) recovering at least one vegetable oil ester corresponding to the formula (I) and any organic acid, so as to obtain a lubricating base comprising an acid number, in mg KOH/g, measured according to standard ISO 6618, ranging from 0 to 0.5.

Preferably, the vegetable oil of step (a) comprises at least one triglyceride of the following formula:

(I)

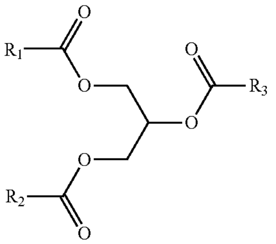

wherein the hydrocarbon groups $R_1$, $R_2$ or $R_3$ are as defined above except that at least one group among $R_1$, $R_2$ and $R_3$ is branched on its hydrocarbon chain with at least one hydroxyl group —OH.

Generally, at least two groups and typically all three groups among $R_1$, $R_2$ and $R_3$ are branched on their hydrocarbon chains with at least one hydroxyl group —OH.

In particular, esterification step (b) is carried out on said at least one hydrocarbon chain $R_1$, $R_2$ and $R_3$ in position 9, 10, 12 or in position 14.

In general, the vegetable oil is selected from one or more of the following oils: castor oil, lesquerella oil or any other oil comprising at least 50% fatty acids (relative % determined by GPC) selected from: ricinoleic acid (C18:1-OH), densipolic acid (C18:2-OH), lesquerolic acid (C20:1-OH), or auricolic acid (C20:2-OH).

Typically, the vegetable oil selected is chosen from castor oil, lesquerella oil or a mixture thereof.

Step (a) of hydrogenating a vegetable oil is known to the person skilled in the art and will not be detailed further below. Alternatively, it is possible to obtain a previously hydrogenated vegetable oil as defined above.

The esterification step (b) is thus carried out between the hydrogenated vegetable oil and an organic acid anhydride.

Preferably, the organic acid anhydride corresponds to the formula (II) below:

(II)

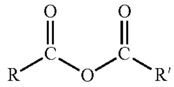

where R and R' are independently selected from a linear or branched alkyl chain comprising from 1 to 12, in particular from 1 to 6 and typically from 1 to 4 carbon atoms.

In particular, the organic acid anhydride is selected from the group consisting of an acetic (ethanoic) anhydride, a propanoic anhydride, a butyric anhydride or an isobutyric anhydride, a ethanoic propanoic anhydride, a pentanoic anhydride, an isopentanoic anhydride, a hexanoic anhydride, a heptanoic anhydride, an octanoic anhydride, a nonanoic anhydride, a decanoic anhydride, an undecanoic anhydride, a dodecanoic anhydride.

This is introduced, preferably continuously, into the hydrogenated vegetable oil at a flow rate ranging from 0.05 L/h/kg to 0.2 L/h/kg of hydrogenated vegetable oil, preferably from 0.06 L/h/kg to 0.15 L/h/kg of hydrogenated vegetable oil and typically from 0.08 L/h/kg to 0.12 L/h/kg of hydrogenated vegetable oil.

According to the invention, "a flow rate that can range from 0.05 L/h/kg to 0.2 L/h/kg hydrogenated vegetable oil" includes the following values or any interval between these values: 0.05; 0.06; 0.07; 0.08; 0.09; 0.10; 0.11; 0.12; 0.13; 0.14; 0.15; 0.16; 0.17; 0.18; 0.19; 0.20.

In general, the organic acid anhydride is continuously added (to the hydrogenated vegetable oil mixture) at a rate ranging from 0.001 to 1 L/h/kg, preferably from 0.005 to 0.05 L/h/kg and typically 0.01 L/h/kg hydrogenated vegetable oil or in a single addition.

The esterification step (b) is generally carried out at a temperature below 200° C., in particular ranging from 90° C. to 150° C., preferably from 100° C. to 140° C. and typically from 110° C. to 130° C.

This step (b) generally lasts from 3 to 7 hours, in particular from 4 to 6 hours and typically about 5 hours. This period of time may be much shorter in a continuous flow reaction, for example through a static reactor.

It is ideal to monitor acid number measured according to ISO 6618 and hydroxyl number by Fourier transform infrared spectroscopy (FTIR) until the hydroxyl number IOH is less than or equal to 1 mg KOH/g.

Esterification step (b) can be carried out with or without a catalyst.

By way of example, a basic or acidic catalyst such as strong acids and sulphonic resins of the AMBERLYST or NAFION type may be suitable. In general, the use of a catalyst makes it possible to reduce temperature used during this esterification step (b) and/or to increase the reaction rate.

Between this esterification step (b) and before conducting recovery of the compound of the formula (I) according to the invention (c), it is possible to carry out the following intermediate steps:

(b1) a topping step;

(b2) a cooling step, (b3) optionally a neutralisation step;

(b4) optionally a fine filtration step.

During the topping step (b1), the organic acid formed is removed by heating the product obtained at the end of step (b) to a temperature above the boiling point of the organic acid anhydride. The boiling point of acetic anhydride, for example, is 139° C. at atmospheric pressure. This step can thus be carried out at a temperature ranging from 140° C. to 200° C., preferably from 150° C. to 190° C. and generally from 160° C. to 170° C. To reduce the temperature, vacuum can be applied during this step. Depending on the temperature and vacuum selected, this step (b1) can last from 1 to 5 hours, preferably 2 to 4 hours and generally lasts 3 hours. It is ideal to monitor reaction by Fourier transform infrared spectroscopy (FTIR) until the hydroxyl number IOH is less than or equal to 2 mg KOH/g and the acid number is less than or equal to 1 mg KOH/g, preferably less than or equal to 0.5 mg KOH/g (ISO 6618).

During the cooling step (b2), the temperature of the product resulting from step (b1) is lowered to a temperature less than or equal to 60° C., preferably less than or equal to 50° C. and typically less than or equal to 40° C. This step (b2) can last from 0.5 hour to 3 hours, preferably from 0.75 hour to 2.5 hours and generally lasts from 1 to 2 hours.

During the neutralisation step (b3), the cooled product from step (b2) is neutralised. For this, less than 5%, in particular less than 3%, and typically from 0.5 to 1% of neutralising additive is used, by mass, relative to the total mass of the product from step (b2); the product is then placed in a vacuum reactor in order to remove water; it is heated to a maximum temperature of 100° C., preferably 90° C. and typically 80° C., until the medium is dehydrated and the product is generally placed on a filter of the filter press type, for example on a bed of Dicalite®.

During the fine filtration step (b4), the product from step (b3) is possibly placed on a filter allowing fine filtration, such as a Gauthier® filter, for example, at a maximum temperature of 70° C.

Following this step (b4), an ester of the formula (I) is recovered (step (c) of the process) and, if necessary, an organic acid is recovered if this has not been removed during the esterification reaction.

The preparation process according to the invention has many advantages. Firstly, it thus implements an esterification step (b) which is generally carried out at a lower temperature than conventional esterification reactions and is therefore less energy-intensive than the latter (the temperature is in the order of 120-160° C. versus 220-260° C. for a conventional esterification reaction). Moreover, the heating and cooling ramps used during the preparation process (esterification step (b)/topping step (b1)/cooling step (b2)) are shorter. The times for each step and especially the number of steps from the starting extracted and refined oil are further reduced, especially compared with the production of the isostearate mentioned in the description of prior art. Indeed, the production of isostearate requires at least four synthesis steps from the refined oil (i.e.: hydrolysis of rapeseed oil into fatty acids/dimerisation and production of isostearic acid/hydrogenation and distillation/esterification into isostearic acid) versus two for the process according to the invention. Of course, the different embodiments described above for the use of the compounds of the formula (I) also apply to the preparation process and will not be repeated hereafter (and conversely, the different embodiments described above for the preparation process according to the invention also apply to the use according to the invention).

By way of example, the lubricating base comprises, by mass, relative to its total mass, at least 50%, preferably at least 80%, in particular at least 90% and typically 100% of said at least one compound of the formula (I).

Thus, the process may include a step (ii) which comprises mixing said at least one vegetable oil ester having the formula (I) obtained at the end of step (i) with at least one other biodegradable lubricating compound.

Said other biodegradable lubricating compound, different from the compound of the formula (I) may be an alkyl, for example C1-C10, or neopolyol isostearate, a polyalphaolefin (PAO), a mineral oil or a mixture thereof.

The present invention is also directed to a lubricating base obtained by the preparation process as defined above, characterised in that it has an acid number, in mg KOH/g, measured according to standard ISO 6618, ranging from 0 to 0.5.

Preferably, the lubricating base has a resistance to hydrolysis, measured according to standard DEF STAN 05-50 (part 61) method 6, which ranges from 300 to 2000 hours.

In general, the lubricating base comprises, by mass, relative to its total mass, at least 50%, preferably at least 80%, in particular at least 90% and typically 100% of said at least one compound of the formula (I).

Of course, the different embodiments described above for the use of the compounds of the formula (I), as well as for the process, also apply to the lubricating base obtained by the preparation process and will not be repeated hereafter.

Of course, the different embodiments described above for the use of the compounds of the formula (I) or the preparation process described above also apply to the lubricant composition (and vice versa) and will not be repeated hereafter.

EXAMPLES

A°) Examples of Preparation of Compounds (I) According to the Invention

Example 1: Process for Preparing a Compound of the Formula (I) (Ester with Branched Long Fatty Chains) Obtained by Esterification of Castor Oil with an Acetic Anhydride The process is carried out using the following raw materials with the contents indicated in Table 1 below:

TABLE 1

| Raw materials | Supplier | Quantity in L |
|---|---|---|
| Castor oil | Jayant Agro Organics or Berg Schmidt (Sternoil HCO) comprising 80-85% ricinoleic acid by mass, relative to the total mass | 20 L |
| Acetic anhydride | Carlo Erba | 0.1 L/h/kg castor oil |

In general, the preparation process is carried out under very mild conditions (with or without a catalyst) at a temperature of 120° C., while drawing off acetic acid formed during the esterification reaction:

- the castor oil is first hydrogenated so as to obtain a castor oil in which all the hydrocarbon fatty chains have been saturated;
- the hydrogenated castor oil is heated until it melts completely at 120° C. (the theoretical melting temperature is 90° C.);
- acetic anhydride is continuously introduced at a rate of 0.1 L/h/Kg of hydrogenated castor oil;
- the hydroxyl number is monitored in parallel by Fourier Transform Infrared Spectroscopy (FTIR) until the hydroxyl number IOH is less than 1 mg KOH/g; all of these steps generally take 5 hours and a clear product is obtained;
- acetic acid formed is then removed by increasing the temperature from 120° C. to 160° C. (the boiling point of acetic acid is 118° C. and that of acetic anhydride is 139° C. at atmospheric pressure) for a period of 3 hours at a pressure of 20 mbar;
- the product obtained is then cooled from 160° C. to 40° C.;
- the product obtained is neutralised by adding 0.5 to 1% neutralising agent and black (by mass relative to the total mass of product)/the product obtained is placed in a vacuum reactor in order to remove water/heated to a maximum temperature of 80° C. until the medium is dehydrated and filtered on Dicalite®;
- filtration is carried out on a Gauthier® filter at a maximum temperature of 70° C., in order to obtain a brilliant clear product.

Example 2: Process for Preparing a Compound of the Formula (I) (Ester with Branched Long Fatty Chains) Obtained by Esterification of Castor Oil with a Butyric Anhydride For this example, the process is the same as for example 1, except that acetic anhydride is replaced with butyric anhydride under the conditions set out in Table 2 below:

TABLE 2

| Raw materials | Supplier | % by mass |
|---|---|---|
| Castor oil | Jayant Agro Organics or Berg Schmidt (Sternoil HCO) comprising 85% ricinoleic acid by mass, based on the total mass | 20 L |
| Butyric anhydride | Aldrich | 0.1 L/h/kg castor oil |

Example 3: Process for Preparing a Compound of the Formula (I) (Branched Long Fatty Chain Ester) Obtained by Esterification of Castor Oil with an Isobutyric Anhydride For this example, the process is the same as for example 1, except that acetic anhydride is replaced with isobutyric anhydride under the conditions set out in Table 3 below

TABLE 3

| Raw materials | Supplier | % by mass |
|---|---|---|
| Castor oil | Jayant Agro Organics or Berg Schmidt (Sternoil HCO) comprising 85% ricinoleic acid by mass, based on the total mass | 20 L |
| Isobutyric anhydride | Aldrich | 0.1 L/h/kg castor oil |

Examples 4 to 7: Process for Preparing a Lubricating Base According to the Invention Lubricating bases according to the invention have been prepared by mixing the compound of the formula (I) of example 1 with an isostearate (NYCOBASE SMP marketed by NYCO) according to the following mass contents (by mass, relative to the total mass of the lubricating base composition thus formed):

TABLE 4

| | Examples (invention) | 4 | 5 | 6 | 7 |
|---|---|---|---|---|---|
| Ex. 1 | Vegetable oil ester according to | 60 | 75 | 50 | 25 |
| | Isostearate | 40 | 25 | 50 | 75 |

B°) Characterisation of the Esters According to Examples 1 to 7 Described Above and of a Comparative Example (Isostearate)

The lubricating bases according to the invention and prepared according to examples 1 to 4 have the following characteristics (table 5). By way of comparison, the comparative example, hereinafter referred to as "Comp.1", illustrates a lubricating base comprised of 100% the isostearate mentioned above (NYCOBASE SMP product marketed by the company NYCO):

TABLE 5

| | | Lubricating base (invention) | | | | Comp.1 | |
|---|---|---|---|---|---|---|---|
| Characteristics | Units | Ex.1 | Ex.2 | Ex.3 | Ex.4 | (prior art) | Methods |
| Appearance | — | Clear | Clear | Clear | Clear | Clear | Clear |
| Gardner Colour | | 1 | 2 | 1.5 | — | 3 | ASTM D1544 |
| Apha Colour | | 200 | — | — | — | — | ASTM 1209 |
| Density | — | 0.956 | 0.946 | 0.944 | — | 0.922 | ASTM D4052 |
| Viscosity at 100° C. | $mm^2/s$ | 19.1 | 18.5 | 18.0 | 18.2 | 18.2 | ISO 3104 |
| Viscosity at 40° C. | $mm^2/s$ | 163 | 136 | 135 | 149.5 | 147.4 | ISO 3104 |
| Viscosity index | — | 134 | 153 | 149 | 136 | 138 | ISO 2909 |
| Acid number | mg KOH/g | 0.02 | 0.01 | 0.01 | — | 0.02 | ISO 6618 |
| Hydroxyl number | | 1.51 | 0 | 0 | — | 6 | ASTM E222B |
| Flash point COC | | 302 | 294 | 272 | — | 318 | ASTM D92 |
| Foaming at 24° C. | mL/mL | 0/0 | — | — | — | 580/480 | ASTM D892 |
| Foaming at 94° C. | mL/mL | 0/0 | — | — | — | 30/0 | ASTM D892 |
| Foaming at 24° C./94° C. | mL/mL | 0/0 | — | — | — | 580/420 | ASTM D892 |
| Demulsification at 82° C. | min | 5 | — | — | — | 15 | ASTM D1401 |
| Air release at 75° C. | min | 2.5 | — | — | — | 3 | NF ISO 9120 |
| Copper corrosion | Copper plate appearance | | 1b | | 3b | unchanged | ASTM D130 |
| Stability to hydrolysis | h | 797 | 837 | 850 | — | 400 | ASTM D2619 |

As shown in Table 5 above, the lubricating bases according to the invention exhibit adequate technical lubrication performance close to the comparative example Comp. 1 (isostearate), especially in terms of viscosity grade, viscosity index and flash point.

However, this table 5 also shows that the lubricating bases according to the invention exhibit improved interfacial properties compared to those of Comp.1: no foaming problems, rapid de-emulsification and air release times. Furthermore, they are more stable to hydrolysis (resistance to hydrolysis) than Comp.1. The lubricant compositions according to the invention thus have enhanced stability in marine, aqueous or even damp environments and are therefore ideal for lubricating gears located, for example, in offshore or onshore wind farms.

Table 6 below shows technical performance of the lubricant compositions of Examples 1, 4 to 7 according to the invention and of Example Comp.1:

TABLE 6

| Characteristics | Units | Ex.1 | Ex.4 | Ex.5 | Ex.6 | Ex.7 | Comp.1 | Method |
|---|---|---|---|---|---|---|---|---|
| Viscosity at 100° C. | $mm^2/s$ | 19.1 | 18.2 | 18.7 | 18.4 | 18.2 | 18.5 | ISO 3104 |
| Viscosity at 40° C. | $mm^2/s$ | 163 | 149.5 | 154 | 151 | 149 | 151 | ISO 3104 |
| Viscosity index | — | 134 | 136 | 137 | 137 | 136 | 138 | ISO 2909 |

As mentioned above, and although it is not necessary insofar as the compounds of the formula (I) exhibit adequate technical lubrication performance.)

C°) Comparative Test Between the Process According to the Invention and the Process Described in Document U.S. Pat. No. 2,049,072

A comparative test has been carried out by the Applicant in order to compare performance of the vegetable oil esters obtained according to the process according to the invention and those obtained according to the process described in document U.S. Pat. No. 2,049,072 (hereinafter referred to as US'072).

In particular, examples 1 and 2 of that document have been reproduced using the parameters/standards described in that document US'072. These examples are hereinafter referred to as Comp.2 and Comp.3, respectively.

The results of this comparative test are summarised in Table 7 below. The first column corresponds to the characteristics of pure castor oil, the second and fourth columns correspond respectively to the characteristics of Ex.1 and Ex.2 described in document US'072, the third and fifth columns correspond to the characteristics of Ex.1 and Ex.2 measured by the Applicant and the sixth column corresponds to the castor oil ester according to Ex.1 of the invention.

TABLE 7

| | Comp.2 (Ex.1 of US'072) | Comp.2 Ex.1 of US'072 reproduced by NYCO) | Comp.3 (Ex.2 of US'072) | Comp.3 (Ex.2 of US'072 reproduced by NYCO) | Ex.1 (invention) |
|---|---|---|---|---|---|
| Gardner Colour | — | 4 | — | 4 | 4 |

TABLE 7-continued

| | Comp.2 (Ex.1 of US'072) | Comp.2 Ex.1 of US'072 reproduced by NYCO) | Comp.3 (Ex.2 of US'072) | Comp.3 (Ex.2 of US'072 reproduced by NYCO) | Ex.1 (invention) |
|---|---|---|---|---|---|
| Viscosity at 100° F. (SSU) | 569 | 533 | 815 | 788 | 751 |
| Viscosity at 40° C. ($mm^2/s$) | 111 | 115 | 158 | 170 | 162 |
| Viscosity at 210° F. (SSU) | 81 | 80.3 | 96.5 | 198.1 | 93.8 |
| Viscosity at 100° C. ($mm^2/s$) | 15.4 | 15.6 | 19.0 | 19.9 | 18.9 |
| VI (viscosity index) US'072 | 129 | — | 125 | — | — |
| VI (viscosity index) measured by NYCO | 146 | 143 | 137 | 135 | 133 |
| Acid number (mg KOH/g) | — | 0.5 | — | 6.5 | 0.07 |
| Stability to hydrolysis | | 74 | | <24 | 400-700 |

It is apparent from this comparative example that measurements of the characteristics in these examples are similar between those described in document US'072 and those measured by the Applicant (apart from the viscosity measurements at 100° C. (SSU) and the measurement of viscosity index VI, where there is a sharp difference). The difference in the viscosity index measurement can certainly be explained by the use of some different calculation mode.

This test shows that the castor oil ester obtained according to the process described in US'072 has too high an acid number. Without being bound to any theory, it would appear that the process of that document (acetylation, followed by hydrogenation further combined with the use of acetyl chloride) would not enable a selective reaction of a castor oil ester to be achieved, but that on the contrary numerous acidic co-products would also be formed.

In view of the acidity of the product obtained (Ex.2 of US'072), this product would be incompatible and would, for example, degrade the elastomer-based seals of the devices to be lubricated, such as casings.

This test also shows that the castor oil ester obtained according to the process described in that document US'072 has very poor resistance to hydrolysis and cannot be intended to be used in an aqueous, marine or even damp environment.

The Applicant has also carried out comparative oxidation and ageing tests (Table 8 below).

This test has been carried out according to standard NF 61125 method C modified for the following parameters:

a. Immersed steel/copper spiral metals used according to ISO 4263 b. Use of the 4263 oxygen flow rate: 3 L/h c. Period of time 168 h and temperature 120° C. (NF 61125).

TABLE 8

| | Comp.2 (Ex.1 of US'072 reproduced by NYCO) | Comp.3 (Ex.2 of US'072 reproduced by NYCO) | Ex.1 (invention) | Comp.1 (prior art) |
|---|---|---|---|---|
| Variation in oil acid number (mgKOH/g) | Not operable, fully polymerised | Not operable, fully polymerised and degraded | 0.5 | 0.6 |
| Volatile acidity (mgKOH/g) | 50 | 70 | 0.5 | 0.1 |
| Variation in viscosity index KV (%) | | | 2.4 | 2.1 |
| Deposits | Significant | significant | 12 | 6 |
| Variation in mass of metals gr (steel copper spiral) | | | 0.02 | 0.02 |

This test shows very sharp differences in oxidation behaviour, implying drastically different lubricant life times, shortened in the case of the examples reproduced from the state of the art US'072.

The invention claimed is:

1. A method for lubricating devices and/or machines, comprising utilizing a fluid lubricating base comprising at least one biosourced and biodegradable compound of the formula (I), wherein said at least one compound of the formula (I) has the following formula:

(I)

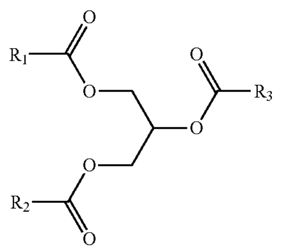

wherein $R_1$, $R_2$ and $R_3$ are independently linear or branched saturated hydrocarbon groups comprising at least 16 carbon atoms, at least one group of $R_1$, $R_2$ and $R_3$ is branched on its hydrocarbon chain with at least one ester group O—CO—$R_4$ wherein $R_4$ is a linear or branched alkyl radical comprising from 1 to 10 carbon atoms, wherein said lubricating base has an acid number, in mg KOH/g, measured according to standard ISO 6618, which ranges from 0 to 0.5, and wherein the lubricating base has a resistance to hydrolysis, measured according to DEF STAN 05-50 (part 61) method 6, which ranges from 300 to 3500 hours.

2. The method according to claim 1, wherein $R_4$ is a linear or branched alkyl radical comprising from 1 to 6 carbon atoms.

3. The method according to claim 1, the hydrocarbon groups $R_1$, $R_2$ and $R_3$ comprise from 18 to 24 carbon atoms.

4. The method according to claim 1, wherein the group $R_4$ of the ester group —O—CO—$R_4$ is selected from a methyl, ethyl, propyl or iso-propyl radical.

5. The method according to claim 1, wherein, on said at least one hydrocarbon chain $R_1$, $R_2$ and $R_3$ branched with the ester group —O—CO—$R_4$, the latter is positioned in position 9, 10, 12 or 14.

6. The method according to claim 1, wherein at least two hydrocarbon groups among $R_1$, $R_2$ and $R_3$ are/is branched with the ester group —O—CO—$R_4$.

7. The method according to claim 6, wherein each hydrocarbon group $R_1$, $R_2$ and $R_3$ are/is branched with the ester group —O—CO—$R_4$.

8. The method according to claim 1, wherein the lubricating base also comprises at least one other biodegradable lubricating compound, different from the compound of the formula (I).

9. The method according to claim 1, wherein the lubricating base has a demulsification time, measured according to ASTM D 1401, ranging from 0 to 30 minutes.

10. The method according to claim 9, wherein the lubricating base has a demulsification time, measured according to ASTM D 1401, ranging from 0 to 15 minutes.

11. The method according to claim 10, wherein the lubricating base has a demulsification time, measured according to ASTM D 1401, ranging from 0 to 10 minutes.

12. The method according to claim 1, wherein the lubricating base has a resistance to hydrolysis, measured according to DEF STAN 05-50 (part 61) method 6, which ranges from 600 to 3000 hours.

13. The method according to claim 12, wherein the lubricating base has a resistance to hydrolysis, measured according to DEF STAN 05-50 (part 61) method 6, which ranges from 750 to 900 hours.

14. A process for preparing a lubricating base according to claim 1, comprising a step (i) of preparing said at least one compound of the formula (I), said step (i) including the following successive steps:

(a) providing at least one previously hydrogenated vegetable oil or hydrogenating a vegetable oil, said vegetable oil being comprised of at least one triglyceride comprising at least 50% (relative % determined by GPC) of fatty acids having at least one saturated or unsaturated, linear or branched hydrocarbon chain comprising at least 16 carbon atoms, one of said fatty acids being branched with at least one hydroxyl group —OH;

(b) selectively esterifying, at said at least one hydroxyl group —OH, said at least one fatty acid of said hydrogenated vegetable oil obtained at the end of step (a) with at least one organic acid anhydride;

(c) recovering at least one vegetable oil ester having the formula (I), so as to obtain a lubricating base comprising an acid number, in mgKOH/g, measured according to standard ISO 6618, ranging from 0 to 0.5, and having a resistance to hydrolysis, measured according to DEF STAN 05-50 (part 61) method 6, which ranges from 300 to 3500 hours.

15. The preparation process according to claim 14, wherein the vegetable oil of step (a) comprises at least one triglyceride of the following formula:

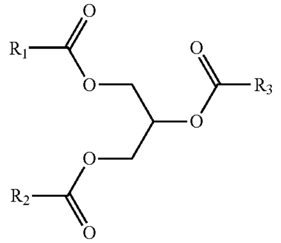

(I)

wherein the hydrocarbon groups $R_1$, $R_2$ or $R_3$ are independently saturated, linear or branched hydrocarbon groups comprising at least 16 carbon atoms, at least one of $R_1$, $R_2$ and $R_3$ is branched on its hydrocarbon chain with at least one hydroxyl group —OH.

16. The preparation process according to claim 14, wherein the vegetable oil is selected from one or more of the following oils: castor oil, lesquerella oil or any other oil comprising at least 50% fatty acids (relative % determined by GPC) selected from: ricinoleic acid (C18:1-OH), densipolic acid (C18:2-OH), lesquerolic acid (C20:1-OH), or auricolic acid (C20:2-OH).

17. The preparation process according to claim 14, wherein the process comprises the following intermediate steps between said esterification step (b) and the step (c) of recovering said at least one vegetable oil ester:

(b1) a topping step;

(b2) a cooling step, (b3) optionally a neutralisation step;

(b4) optionally a fine filtration step.

18. The preparation process according to claim 14, wherein the organic acid anhydride has the formula (II) below:

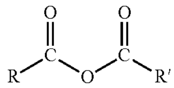

(II)

where R and R' are independently selected from a linear or branched alkyl chain comprising from 1 to 12.

19. The preparation process according to claim 18, wherein the organic acid anhydride of formula (II) is selected from the group consisting of acetic anhydride, butyric anhydride or isobutyric anhydride and a mixture thereof.

20. A lubricating base obtained by the preparation process according to claim 14, wherein it has an acid number, in mg KOH/g, measured according to standard ISO 6618, ranging from 0 to 0.5 and wherein it has a resistance to hydrolysis, measured according to DEF STAN 05-50 (part 61) method 6, which ranges from 300 to 3500 hours.

* * * * *